United States Patent Office 2,716,075
Patented Aug. 23, 1955

2,716,075

POLYETHYLENE COATING AND METHOD OF APPLYING THE SAME

Randolph A. Wiese, New York, N. Y., assignor to the United States of America as represented by the United States Atomic Energy Commission No Drawing. Application March 17, 1954, Serial No. 416,971

7 Claims. (Cl. 117—72)

This invention relates to the production of chemically inert, organic thermoplastic coatings on various structural materials such as concrete, wood, brick, and the like. More particularly, the invention is concerned with the application to the interior surfaces of containers such as vats, tanks, reactors, and the like of a strongly adherent coating of polyethylene which is resistant to the action of a wide variety of chemically active liquids and solutions. The method of the invention is especially useful in providing concrete tanks with polyethylene lining and will be illustratively described for this application, although as the description proceeds it will be apparent that the method may also be used with advantage to coat other types of surfaces with other resins.

It has been recognized heretofore that polyethylene is a particularly useful material for the preparation of chemically resistant coatings because of its inertness toward acids, alkalies, salt solutions and many organic liquids, provided that an impermeable coating of the polyethylene can be formed on the surface to be treated. It has been further recognized that polyethylene, since it is readily fusible without decomposition, is well adapted to be applied to surfaces by flame-spraying techniques, and the application of polyethylene coatings to metal surfaces by flame-spraying has been previously proposed.

However, the coating of concrete with polyethylene presents certain special problems because of the nature of the concrete surface. Thus, concrete surfaces are not readily wet by the molten polyethylene and hence it is difficult to secure adequate bonding of the polyethylene to the concrete surface. Moreover, concrete contains a certain amount of water which is released at flame-spraying temperatures in the form of water vapor and therefore it is difficult to form a smooth impermeable coating on the concrete. Also, the applied polyethylene coating tends to shrink upon cooling, thereby aggravating the problem of securing satisfactory adherence of the coating.

It is accordingly an object of the present invention to provide an improved method of applying organic synthetic resin coatings to the surfaces of structural materials. It is another object of the invention to provide a method of applying a strongly adherent, substantially impermeable polyethylene coating to a concrete surface. Other objects of the invention will be in part obvious and in part pointed out hereafter.

In one of its broader aspects the method of the invention comprises applying to the surface of a structural material an organic solvent solution of a synthetic resin, evaporating the solvent to deposit a resin coating on the surface of the material, and thereafter flame-spraying a coating of an inert thermoplastic resin on the solvent-deposited resin layer. It has been found, particularly in the case of materials which contain water that is releasable as water vapor at flame-spraying temperatures, that the application of a preliminary resin coating deposited from organic solvent solution greatly improves the adherence and imperviousness of a subsequently flame-sprayed inert resin coating.

In a somewhat narrower aspect of the invention a concrete surface is treated with four successive coating materials of different compositions, the last coating being substantially pure polyethylene which has the desired resistance to chemical reagents. In accordance with this aspect of the invention the concrete surface is first treated with a resorcinol-phenol-formaldehyde resin in organic solvent solution. The solution, which might be termed a glue size, can be applied either by brushing or spraying and after application is permitted to dry to deposit a resin coating on the concrete surface. Thereafter a coating of phenol-formaldehyde-rubber cement is applied to the surface by deposition from organic solvent solution as in the case of glue.

The third coating material used in a mixture of polyethylene and inert filler material, which mixture is applied by flame-spraying in known manner. Any of various commercially available flame-spray guns capable of receiving the material to be sprayed in powder form can be used in carrying out this step of the process. The primary purpose of incorporating the inert material in this layer is to provide a degree of thermal insulation between the underlying coatings of glue size and cement and the finishing layer of polyethylene. By providing such an insulating layer, it is possible to apply the pure polyethylene coating at a relatively higher temperature and thereby achieve a more firmly adherent and impervious outer coating. As indicated, the fourth coating material is pure polyethylene which is applied by flame-spraying.

In order to point out more fully the nature of the present invention the following specific example is given of a preferred embodiment of the present method:

The concrete surface that is to be treated according to the present method should be as nearly as possible free from foreign materials, especially materials that might produce a gas or vapor at flame-spraying temperatures. Loam, lime, plaster fragments and similar materials should be removed by washing with water and a stiff brush. Paint, oil and similar materials, if present, should be burned to a cinder and then removed with a wire brush. All sharp corners, either internal or external, should be provided with curved fillet or rounded off to a radius of curvature preferably no less than one inch.

When the surface has been properly prepared it is sprayed with a glue-size as described above. This may be an alcohol solution of a resorcinol-phenol-formaldehyde resin containing 30% to 45% solids. The initial coating should be allowed to dry at least four hours before application of the second coating.

The liquid cement used for the second coating may desirably be a modified phenolic type resin plasticized with acrylonitrile-type rubber and dissolved in a solvent which is essentially methyl-ethyl-ketone containing a small amount of amyl acetate to slow down the solvent evaporation rate and facilitate application of the cement. The solid phase of the solution contains about three parts of resin by weight to two parts by weight of rubber. Two coats of this cement are used with a drying period following each coat.

As indicated above, the third coating material used is a mixture of polyethylene and inert, thermally resistant filler. The polyethylene is a powder having an average molecular weight of 20,000 or more and a particle size less than 60 mesh. This powder is mixed with a pure finely divided silica and a quantity of alkali aluminum silicate. The silica used is preferably 99.5+% pure and has a particle size largely between 80- and 170-mesh. The alkali aluminum silicate is a potash type mica $(H_2KAl_3(SiO_4)_3)$, with flake-type particles mostly less than 325-mesh in size. The mixture contains 35–50% by weight of polyethylene, 45–55% by weight of silicon dioxide and 5–10% by weight of the alkali aluminum silicate. If desired a colored pigment can be added to the mixture to make it easier to keep track of the portions of the surface that have been sprayed therewith.

Two successive layers of the polyethylene-containing mixture as thus prepared are flame-sprayed on the surface to be treated with a flame-spray gun of known type. Each layer is cross sprayed, evened up, and then wet into the cement with an air-balanced flame wash hot enough to polymerize thoroughly the under coats of cement. Since a flame wash at about 325° F. is required to polymerize the cement and diffuse part of it up into the first flame-sprayed layer, it is important that this first flame-sprayed layer be flame washed until it is wet and a strong odor of polymerizing cement is observable.

The second layer of polyethylene containing inert material should also be cross sprayed, evened up, and then wet into the underlying coat with an air-balanced flame wash. In the case of this second layer, the heating should be only enough to shrink the layer in place and provide maximum adhesion to the underlying layer.

When the two insulating layers have cooled, one or more flame-sprayed layers of pure polyethylene are applied. The number of pure polyethylene layers to be applied depends upon the thickness of coating desired. Each layer is cross sprayed and evened up as in the case of the previous layers. However, it is desirable that a relatively higher temperature be used, i. e., a temperature as high as the resin can be handled without degrading it. Each layer is flame washed until it becomes wet and glazes over, thereby ensuring good adhesion to the next preceding layer.

Typical sections of linings or coatings made by the method of this invention show, starting from the outer surface, an uppermost layer of polyethylene adjacent and bonded to a layer of a mixture of polyethylene, silica and alkali aluminum silicate. Further towards the surface of the structural material, a stratum of this mixture layer appears to have formed a diffusion bond with the polymerized phenolic rubber composition which in turn is bonded to the glue size adhering to the surface of the structure. Where the structural material is concrete or any other material having a surface which is porous and produces vapor pressure when heated, the glue size penetrates into and fills up the voids at or near the surface of the concrete.

From the foregoing description it should be apparent that the present invention provides an effective method of achieving the several objects set forth at the beginning of the present specification. By using successive layers of solvent applied resin, resin cement, filled polyethylene and pure polyethylene, a desired polyethylene top coat is obtained which is strongly bound to the concrete surface and substantially impermeable. It is of course to be understood that the example given above is illustrative only and that numerous changes in the materials used and operating procedure can be made within the scope of the invention as defined in the appended claims.

I claim:
1. The method of producing a polyethylene coating on a structural surface which comprises successively applying thin layers of the following materials to said surface in the stated order: (1) a resorcinol-phenol-formaldehyde resin in an organic solvent (2) a phenol-formaldehyde-rubber cement and thereafter flame spraying thin layers of (3) a mixture of polyethylene and finely divided silica and (4) polyethylene.

2. The method of producing a polyethylene coating on a concrete surface which comprises applying to said cement surface a liquid cement which is a 30 to 35% by weight solution of a resorcinol-phenol-formaldehyde resin in an organic solvent, causing said solvent to evaporate, then applying to the resulting resin layer a liquid cement which is an organic solvent solution of a modified phenolic type resin plasticized with acrylonitrile-butadiene type rubber in the proportions of about two parts by weight of rubber to three parts of resin, and causing the solvent to evaporate, then applying to the resulting surface a mixture of 35–50% by weight polyethylene, 45–55% by weight silicon dioxide and 5–10% by weight of alkali aluminum silicate, then applying a top layer of substantially pure polyethylene.

3. The method of producing a corrosion-resisting coating on the surface of a structural material which comprises successively applying to said surface (1) a solvent-deposited phenolic resin coating, (2) a flame-sprayed coating of a chemically inert, polyethylene containing a mineral filler having good heat insulating properties, and (3) a flame-sprayed coating composed of substantially pure inert, polyethylene.

4. A method according to claim 3 and wherein the structural material is concrete and the solvent-deposited resin is resorcinol phenol formaldehyde.

5. A method according to claim 4 and wherein the filler is silica.

6. A chemically resistant coated structure which comprises a structural material having an adherent coating of a resorcinol-phenol-formaldehyde resin, bonded thereto a phenol-formaldehyde-rubber resin also forming a diffusion bond with a superimposed mixture of polyethylene and finely divided silica, and bonded to the latter a top layer of polyethylene.

7. A chemically resistant coated concrete which comprises a concrete structure having an adherent coating of a resorcinol-phenol-formaldehyde resin; bonded to said resin a heat polymerized phenol-formaldehyde-rubber resin also bonded to a superimposed mixture of polyethylene, silica and alkali aluminum silicate; and bonded to said mixture an uppermost layer of polyethylene.

References Cited in the file of this patent
UNITED STATES PATENTS

| | | |
|---|---|---|
| 2,299,807 | Dunbar | Oct. 27, 1942 |
| 2,325,408 | Kauppi et al. | July 27, 1943 |
| 2,340,452 | Child et al. | Feb. 1, 1944 |
| 2,448,666 | Fletcher et al. | Sept. 7, 1948 |
| 2,657,153 | Russell | Oct. 27, 1953 |

OTHER REFERENCES

Simons et al.: Handbook of Plastics, 2nd ed., 1949, p. 309.